United States Patent [19]

Narimatsu

[11] Patent Number: 5,459,735
[45] Date of Patent: Oct. 17, 1995

[54] LOGIC INTEGRATED CIRCUIT WITH A SEQUENTIAL CIRCUIT HAVING EDGE TRIGGER FLIP-FLOPS

[75] Inventor: Hiroshi Narimatsu, Tokyo, Japan

[73] Assignee: NEC Corporation, Japan

[21] Appl. No.: 978,867

[22] Filed: Nov. 19, 1992

[30] Foreign Application Priority Data

Nov. 29, 1991 [JP] Japan .................................. 3-316692

[51] Int. Cl.[6] .................... G01R 31/3177; G01R 31/317
[52] U.S. Cl. ........................................ 371/22.3; 371/22.1
[58] Field of Search .......................... 364/186; 371/22.1, 371/22.3, 61

[56] References Cited

U.S. PATENT DOCUMENTS

| | | | |
|---|---|---|---|
| 4,493,077 | 1/1985 | Agrawai et al. | 371/22.3 |
| 4,701,922 | 10/1987 | Kuboki et al. | 371/22.3 |
| 4,879,718 | 11/1989 | Sanner | 371/22.3 |
| 4,894,830 | 1/1990 | Kawai | 371/22.3 |
| 4,897,838 | 1/1990 | Tateishi | 371/22.3 |
| 5,257,267 | 10/1993 | Ishizaka | 371/22.3 |

OTHER PUBLICATIONS

"Design for Testability—A Survey", Thomas W. Williams and Kenneth P. Parker, Proceedings of the IEEE, vol. 71, No. 1, Jan. 1983, pp. 98–112.

Primary Examiner—Ellis B. Ramirez
Assistant Examiner—M. Kemper
Attorney, Agent, or Firm—Laff, Whitesel, Conte & Saret, Ltd.

[57] ABSTRACT

A logic integrated circuit including a combinational logic circuit and 1 numbers of flip-flops for scanning, each flip-flop for scanning including first and second selectors and an edge trigger master/slave flip-flop having a data terminal and a clock terminal for inputting outputs of the first and second selectors and further having a mask terminal so as to operate an exact scan path by a small additional circuit. In a test mode, input signal terminals and output signal terminals of the flip-flops for scanning are connected in series via the first and second selectors controlled by a scan mode control signal and a test mode control signal output from a test signal generating circuit of an external testing device to constitute a sequential circuit for testing. An input signal for testing, output from the test signal generating circuit, is input to the input signal terminal of the first stage flip-flop for scanning is successively shifted upwards to the last stage flip-flop for scanning, and an output signal as a detection signal for discriminating is output from the output signal terminal of the last stage flip-flop for scanning to a waveform observing circuit of an external testing device.

3 Claims, 6 Drawing Sheets

LOGIC INTEGRATED CIRCUIT WITH A SEQUENTIAL CIRCUIT HAVING EDGE TRIGGER FLIP-FLOPS

BACKGROUND OF THE INVENTION

The present invention relates to a logic integrated circuit, and more particularly to a test of integrated master/slave flip-flops in a logic integrated circuit.

DESCRIPTION OF THE PRIOR ART

When roughly dividing, a conventional semiconductor logic integrated circuit includes a combination of a logic circuit and a plurality of scanning flip-flops constituting a sequential circuit for use at a test mode time, as disclosed in Proceeding of the IEEE, Volume 71, January 1983, No. 71, pp. 98–112.

Figure 1:
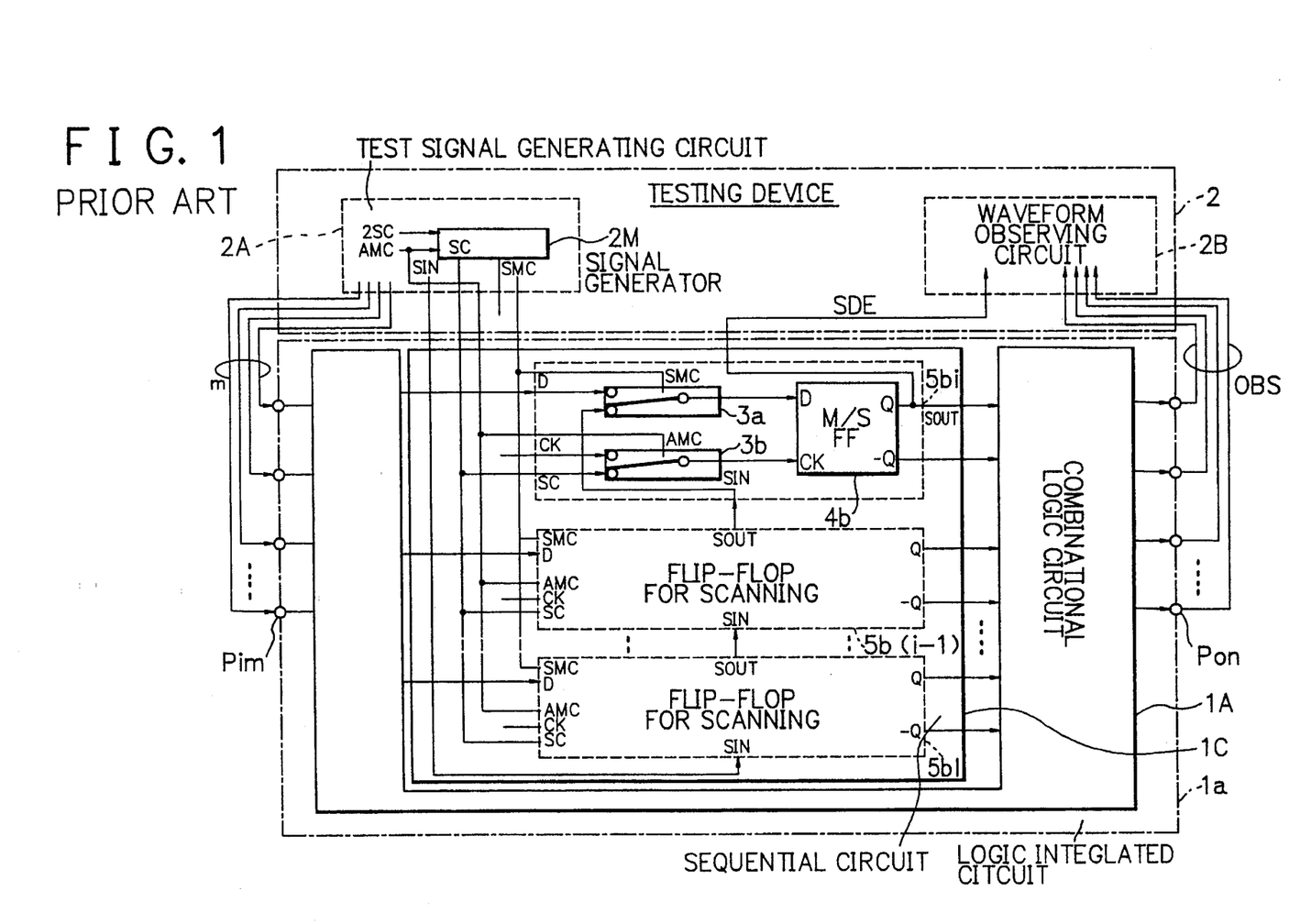
FIG. 1 is a block diagram of a conventional logic integrated circuit and a testing device therefor.

FIG. 1 shows one conventional logic integrated circuit 1a and an external testing device 2 for testing the same. The logic integrated circuit 1a which is to be tested includes a combinational logic circuit 1A and a sequential circuit 1C. The testing device 2 includes a test signal generating circuit 2A having a signal generator 2M and a waveform observing circuit 2B. The test signal generating circuit 2A outputs testing signals to the combinational logic circuit 1A via m input terminals Pi1 to Pim (m=1 to m). The combinational logic circuit 1A outputs observation signals OBS to the waveform observing circuit 2B via n output terminals Poi to Pon (n=1 to n). The sequential circuit 1C includes i flip-flops 5b1 to 5bi for scanning. Each of the flip-flops 5b1 to 5bi includes a pair of first and second selectors 3a and 3b and one master/slave flip-flop 4b. The combinational logic circuit 1A outputs a data signal D to the first selector 3a and the test signal generating circuit 2A outputs an input signal SIN for the test and a scan mode control signal SMC to the first selector 3a. The test signal generating circuit 2A outputs a scan signal SC and a test mode control signal AMC to the second selector 3b. The second selector 3b receives an internal clock signal CK. While the first and second selectors 3a and 3b are controlled by the input signal SIN and the scan signal SC, respectively, the first and second selectors 3a and 3b selectively output the data signal D and the internal clock signal CK to terminals D and CK of the master/slave flip-flop 4b, corresponding to a normal operation mode and a test mode. The master/slave flip-flop 4b outputs a Q signal as an output signal SOUT to the combinational logic circuit 1A. The output signal SOUT of the uppermost flip-flop 5bi for scanning is fed as a detection signal SDE for discrimination to the waveform observing circuit 2B.

Figure 2:
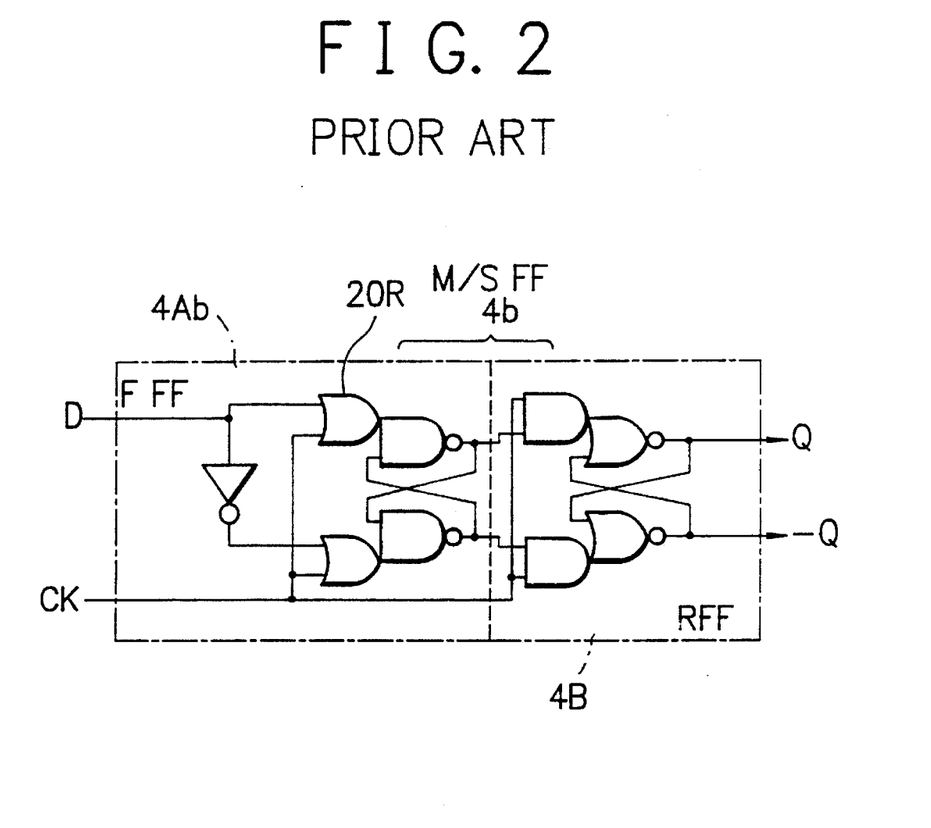
FIG. 2 is a circuit diagram of a master/slave flip-flop shown in FIG. 1.

FIG. 2 shows the master/slave flip-flop 4b shown in FIG. 1. The master/slave flip-flop 4b includes a front stage flip-flop 4Ab and a rear stage flip-flop 4B. The front stage flip-flop 4Ab includes two 2-inputs OR gates 20R for inputting the data signal D and the internal clock signal CK from the terminals D and CK, one inverter and two NAND gates connected to the output side of the OR gates 20R. The rear stage flip-flop 4B includes two AND gates for inputting the internal clock signal CK and the two output signals of the NAND gates of the front stage flip-flop 4Ab, and NOR gates connected to the output side of the AND gates for outputting a Q signal and an inverted (−) Q signal from terminals Q and −Q which are connected to the outputs of the NOR gates. In the first and second selectors 3a and 3b shown in FIG. 1, both test mode control signal AMC and the scan mode control signal SMC are active. There is shown the test mode state of the sequential circuit 1C by using the testing device 2.

On the contrary, when both the test mode control signal AMC and the scan mode control signal SMC are inactive, the first and second selectors 3a and 3b select the data signal D and the internal clock signal CK, respectively, in order to output these signals to the terminals D and CK of the master/slave flip-flop 4b. Thus the flip-flops 5b1 to 5bi execute a predetermined operation of an edge trigger as the master/slave flip-flop 4b within the logic integrated circuit.

Next, the operation in the test mode of the system shown in FIG. 1 will be described. First, the scan mode control signal SMC and the test mode control signal AMC generated by the test signal generating circuit 2A of the testing device 2 are made active. Hence, the input signal SIN for the test and the scan signal SC are passed through the first and second selectors 3a and 3b to input the terminals D and CK of the master/slave flip-flop 4b. Thus, for the value applied as the input signal SIN for the test, every write edge of the flip-flop is input to the master/slave flip-flop 4b of the first flip-flop 5b1 for the scan path. By this operation, a predetermined value can be set to the master/slave flip-flop 4b in the circuit.

Then, the scan mode control signal SMC is made inactive. By applying one internal clock signal CK to the scan signal SC, the value set in the master/slave flip-flop 4b in the above-described operation and the input data of the master/slave flip-flop 4b in the normal operation against the value applied to the terminal D of the circuit can be written in the master/slave flip-flop 4b. Lastly, by making the scan mode control signal SMC active again so as to apply the internal clock signal CK to the scan signal SC, the values written in the flip-flop 5b1 are shifted upwards in the column of the flip-flops 5b1 to 5bi. The output signal SOUT of the uppermost flip-flops 5bi is input as the detection signal SDE to the waveform observing circuit 2B. The waveform observing circuit 2B observes the detection signal SDE and thus can carry out the test of the quality or the good or bad of all master/slave flip-flops 4b.

In this conventional logic integrated circuit, in case of the testing of the sequential circuit composed of the flip-flops for scanning, relating to the respective scan signals SC input to the adjacent front and rear stage flip-flops, when there is a time shift so as to delay the rear stage flip-flop as compared with the front stage flip-flop as the correct shift operation can not be carried out.

This time shift of the scan signals SC can be caused by parasitic elements such as resistances, reactances, capacitances and the like of the scan signal wiring layer. In a large scale integrated circuit, it is difficult to predict these value. Thus, in order to overcome this problem, it is necessary to add a scan signal delay circuit for delaying the scan signals SC.

SUMMARY OF THE INVENTION

It is, therefore, an object of the present invention to provide a logic integrated circuit in view of the aforementioned problems of the prior art, which is capable of performing a test of a sequential circuit including a plurality of flip-flops for scanning. The testing should be performed in an easy, ready and exact manner.

In accordance with one aspect of the present invention, there is provided a logic integrated circuit, comprising: a combinational logic circuit; and a plurality of flip-flops for scanning, each flip-flop for scanning having an input signal terminal and an output signal terminal and including first and second test mode selectors controlled by an external scan mode control signal and an external test mode control signal in a test mode and an edge trigger master/slave flip-flop having a data terminal and a clock terminal for inputting output signals of the first and second test mode selectors, the input signal terminals and the output signal terminals of the flip-flops for scanning being connected in series via the first and second test mode selectors in order to form a sequencer circuit having a first stage input signal terminal and a last stage output signal terminal, an external input signal for testing, an input to the first stage input signal terminal being output as a detection signal for discriminating to an external part from the last stage output signal terminal, the edge trigger master/slave flip-flop including a front stage storage part and a mask circuit having a mask terminal for masking a writing of the input signal for testing in the front stage storage part for a predetermined period when an external mask signal has a period which is equal to an external scan signal and a predetermined leading phase.

The mask circuit of the logic integrated circuit according to the present invention can include 3-input logical OR circuits.

The front stage storage part of the edge trigger master/slave flip-flop of the logic integrated circuit according to the present invention can include CMOS transfer gates as the mask circuit.

BRIEF DESCRIPTION OF THE DRAWINGS

The objects and features and advantages of the present invention will become more apparent from the consideration of the following detailed description, taken in conjunction with the accompanying drawings, in which.

DESCRIPTION OF THE PREFERRED EMBODIMENTS

Figure 3:
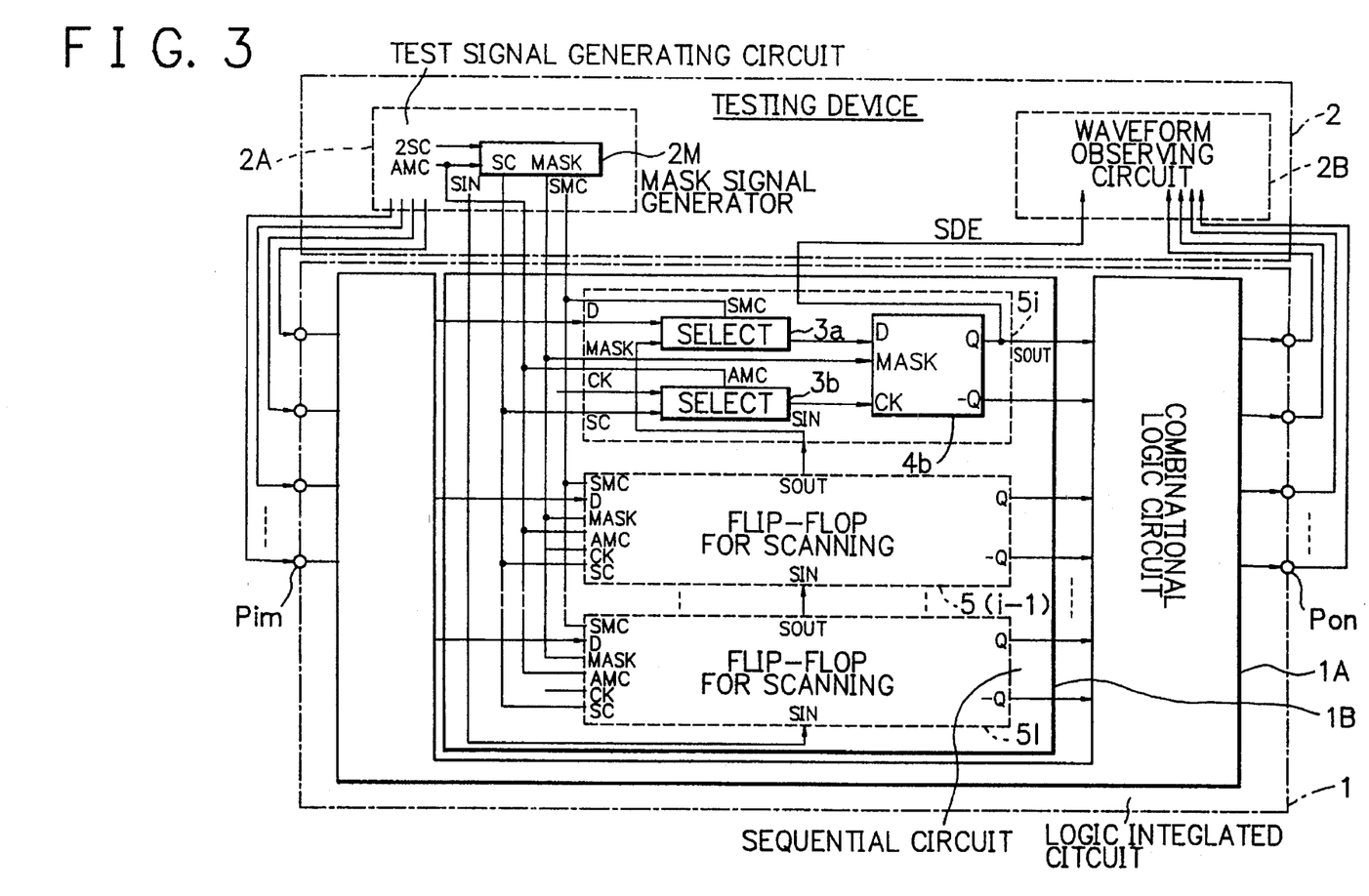
FIG. 3 is a block diagram of a first embodiment of a logic integrated circuit and a testing device therefor according to the present invention.

In the drawings, the parts which are the same as those described above in connection with the conventional embodiment are designated by the same reference characters. Thus there is no need for a repeated description thereof. FIG. 3 shows the first embodiment of a logic integrated circuit and a testing device therefor according to the present invention.

As shown in FIG. 3, a logic integrated circuit 1 which is to be tested by a testing device 2 includes a combinational logic circuit 1A and a sequential circuit 1B or sequencer. The testing device 2 includes a test signal generating circuit 2A having a mask signal generator 2M for generating a mask signal MASK and a waveform observing circuit 2B. The sequential circuit 1B includes i numbers of flip-flops 51 to 5$i$ for scanning. Each of the flip-flops 51 to 5$i$ includes a pair of first and second selectors 3$a$ and 3$b$ and one edge trigger master/slave flip-flop 4 having terminals D, MASK and CK. The output signals of the first and second selectors 3$a$ and 3$b$ are input to the terminals D and CK of the master/slave flip-flop 4. The mask signal MASK generated by the mask signal generator 2M is input to the terminal MASK of the master/slave flip-flop 4.

Figure 4:
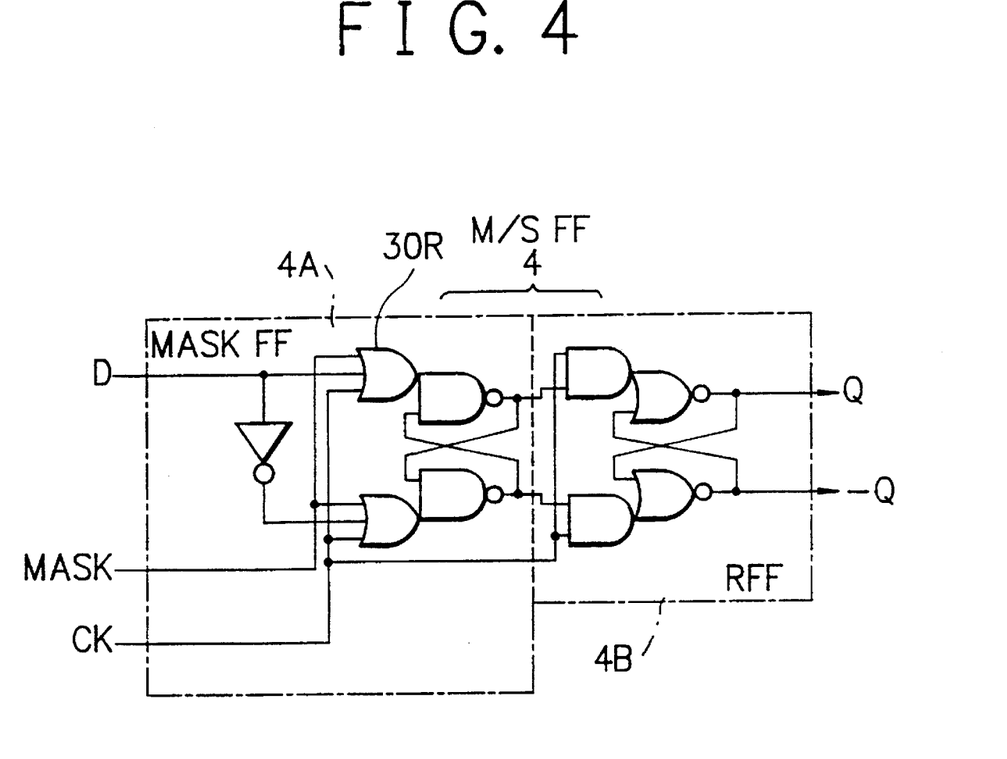
FIG. 4 is a circuit diagram of a master/slave flip-flop shown in FIG. 3.
Figure 5:
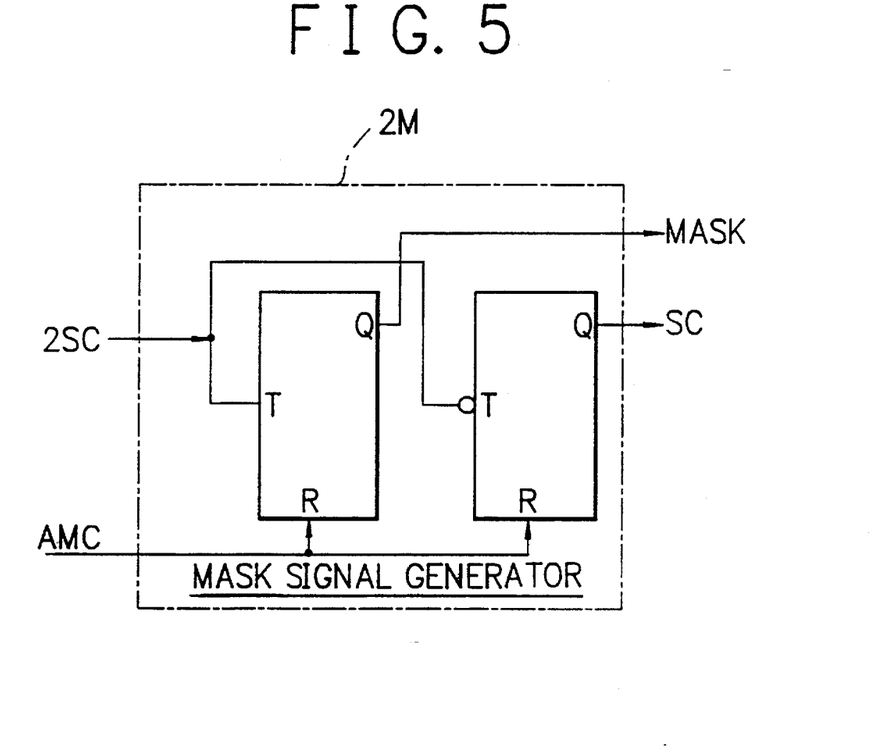
FIG. 5 is circuit diagram of a mask signal generator shown in FIG. 3.
Figure 6:
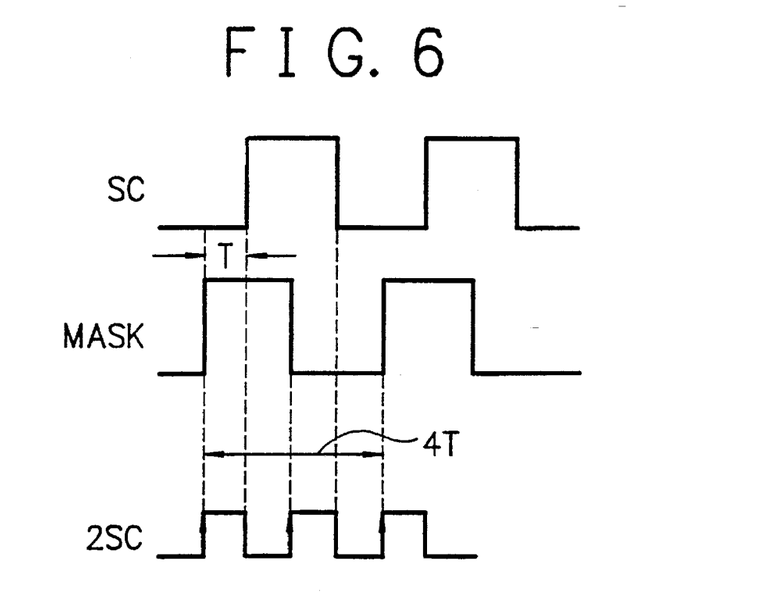
FIG. 6 is a schematic view showing waveforms of signals shown in FIG. 3.

Now, as shown in FIGS. 4, 5 and 6, the master/slave flip-flop 4 inputs the mask signal MASK from the mask signal generator 2M at the terminal MASK, the mask signal MASK having a period 4 T equal to that of a scan signal SC. A leading phase is advanced by time T as compared with the scan signal SC. As shown in FIG. 4, the master/slave flip-flop 4 includes a front stage mask flip-flop 4A including two 3-input OR gates 30R for masking a writing of an output signal SOUT into the master/slave flip-flop 4 and a rear stage flip-flop 4B.

Next, the operation in the test mode of the system shown in FIGS. 3 to 5 will now be described. In this case, the operations of the scan signal SC, the scan mode control signal SMC, the test mode control signal AMC, the input signal SIN for the test, the output signal SOUT and the detection signal SDE are the same as was described for the conventional system and, therefore, can be omitted for brevity. Hence, the operation of the mask signal MASK will be described.

In the test mode, the input signal (SIN) terminals and the output signal (SOUT) terminals of the flip-flops 51 to 5$i$ for scanning are connected in series via the first selectors 3$a$ included therein in order to constitute the sequencer circuit 1B.

The input signal SIN for the test, generated by the test signal generating circuit 2A, is input to the SIN terminal of the first flip-flop 51 for scanning. This input signal SIN for the test is successively shifted upwards in the column of the flip-flops 51 to 5$i$ for scanning. The output signal SOUT as the detection signal SDE for discriminating is output, from the last or uppermost flip-flop 5$i$, for scanning to the waveform observing circuit 2B of the testing device 2.

At the normal mode time as distinguished from the testing time if inputting a logical value "1" is input to the terminal MASK of the front stage mask flip-flop 4A of the master/slave flip-flop 4, the front stage mask flip-flop 4A masks a data writing stage of the front stage flip-flop in order to make a holding stage. However, the mask signal MASK is held to a logical "0" level. Hence there is no output from the 3-input OR gates 30R. Hence, the input terminal D of the master/slave flip-flop 4 is not masked. Thus the master/slave flip-flop 4 operates as the usual edge trigger flip-flop.

In the test mode, as shown in FIG. 6, the mask signal MASK is driven by the clock which has a leading period T which has advanced by ¼ period of the scan signal SC having the period 4 T. During the ¼ period T preceeding the leading edge of the scan signal SC, the writing into the front stage mask flip-flop 4A of the master/slave flip-flop 4 shown in FIG. 4 is masked. Therefore, even when a timing shift of approximately ¼ period T of the scan signal SC is present between the adjacent two flip-flops, the scanning operation can be correctly performed. FIG. 5 shows one embodiment of the master signal generator 2M in which a double frequency scan signal 2SC and the test mode control signal AMC are input to a toggle flip-flop.

According to the present invention, as compared with the conventional logic integrated circuit in which a chip area is increased approximately 40% for adding the scan signal delay circuit in order to prevent the malfunction of the large scaled flip-flops, the chip area is increased approximately 20% for adding the MASK circuit. That is, the chip area for the malfunction measures becomes approximately the half of the corresponding chip area of the conventional circuit.

Figure 7:
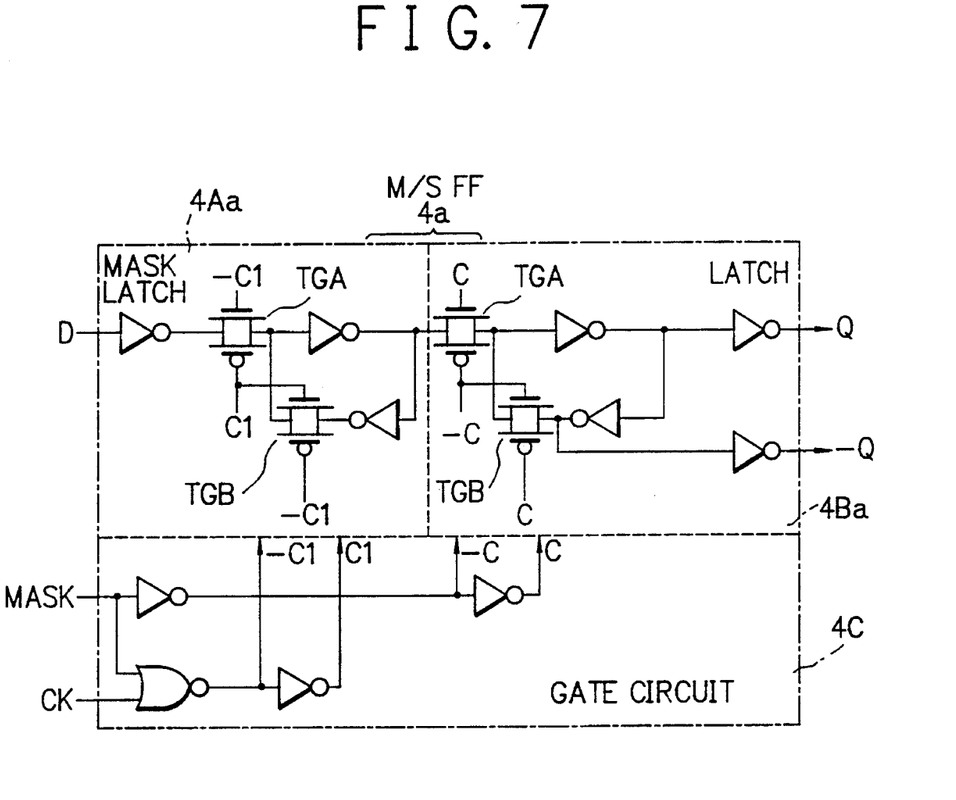
FIG. 7 is a circuit diagram of a master/slave flip-flop of a second embodiment of a logic integrated circuit according to the present invention.

In FIG. 7 shows another master/slave flip-flop 4a of a second embodiment of a logic integrated circuit according to the present invention. The master/slave flip-flop 4a includes a mask front stage latch 4Aa having CMOS transfer gates TGA and TGB as mask circuits and latches. A rear stage latch 4Ba has a structure similar to the structure of the front stage latch 4Aa. A gate circuit 4C is associated with these two latches 4Aa and 4Ba. This gate circuit 4C inputs the internal clock signal CK and the mask signal MASK and outputs two pairs of gate signals C and –C and C1 and –Cl for the transfer gates TGA and TGB of the front and rear stage latches 4Aa and 4Ba. When the mask signal MASK is at the level "0", this master/slave flip-flop 4a operates as a usual edge trigger flip-flop; but, when the mask signal MASK is at the level "1", the writing into the front stage latch 4Aa is masked to keep the holding state.

In the above-described embodiments, although one master/slave flip-flop is included in the flip-flop for scanning, a plurality of master/slave flip-flop can be constructed in a sequencer connection. Further, main master/slave flip-flops are built in the flip-flop for scanning and a part can be left out.

As described above, according to the present invention, since there is means for masking a writing in a front stage flip-flop of a master/slave flip-flop, when a sequencer circuit constructed by using edge trigger flip-flops is tested, by inputting a proper mask signal, a scan path can be operated exactly by providing a small additional circuit.

While the present invention has been described with reference to the particular illustrative embodiments, it is not to be restricted by those embodiments, but only by the appended claims. It is to be appreciated that those skilled in the art can change or modify the embodiments without departing from the scope and spirit of the present invention.

What is claimed is:

1. A logic integrated circuit (1) having an internal clock signal (CK), said logic integrated circuit (1) being testable by a testing device (2), said testing device (2) including:

a test signal generating circuit (2A) for generating a test mode control signal (AMC), a set of test data applicable to a testing of said logic integrated circuit (1), a scan mode control signal (SMC), a scan data signal (SIN) having a sequence of test data applicable to the testing of said logic integrated circuit (1), and a scan clock signal (SC);

said test signal generating circuit (2A) being controllable in the testing of said logic integrated circuit (1) to output the test mode control signal (AMC) and the set of test data, and for a scan data latching operation in the testing of said logic integrated circuit (1) to output the scan mode control signal (SMC), the scan data signal (SIN) and the scan clock signal (SC); and an observation circuit (2B) for observing a set of input data thereto, said logic integrated circuit (1) comprising:

a combinational logic circuit (1A) having a first input connection (Pim) connectable to said test signal generating circuit (2A) to input the set of test data therefrom to said combinational logic circuit (1A), and a first output connection (Pon) connectable to said observation circuit (2B) to output as the set of input data thereto a set of logically operated test data in said combinational logic circuit (1A);

a plurality of sequentially identified scanning flip-flop circuits (5l–5i) having a second input connection (AMC, SMC, SIN, SC) connectable to said test signal generating circuit (2A);

said plurality of scanning flip-flop circuits (5l–5i) each respectively comprising:

a data signal selector (3a) having a test data input terminal (D) connected to a certain portion of said combinational logic circuit (1A), a scan data input terminal (SIN), and a selected data output terminal;

said data signal selector (3a) being responsive to the scan mode control signal (SMC) input thereto through said second input connection to selectively connect the selected date output terminal to the test data input terminal (D) and to the scan data input terminal (SIN) so that the scan data input terminal (SIN) is connected to the selected data output terminal in the scan data latching operation of said logic integrated circuit (1);

a clock signal selector (3b) having an internal clock input terminal (CK) for receiving the internal clock signal (CK) of said logic integrated circuit (1), a scan clock input terminal (SC) connected to said second input connection to receive therefrom the scan clock signal (SC), and a selected clock output terminal;

said clock signal selector (3b) being responsive to the test mode control signal (AMC) input thereto through said second input connection to selectively connect the selected clock output terminal to the internal clock input terminal (CK) and to the scan clock input terminal (SC) so that the scan clock input terminal (SC) is connected to the selected clock output terminal in the scan data latching operation of said logic integrated circuit (1); and a data latching master/slave flip-flop circuit (4) of an edge trigger type having a selected data input terminal (D) connected to the selected data output terminal of said data signal selector (3a), a selected clock input terminal (CK) connected to the selected clock output terminal of said clock signal selector (3b), and a latched data output terminal (Q) connected to another portion of said combinational logic circuit (1A);

a first identified one (51) of said plurality of scanning flip-flop circuits (5l–5i) being connected at the scan data input terminal (SIN) of said data signal selector (3a) thereof to said second input connection to receive therefrom the scan data signal (SIN);

an arbitrary one, but a last identified one (5i), of said plurality of scanning flip-flop circuits (5l–5i) being connected at the latched data output terminal (Q) of said master/slave flip-flop circuit (4) thereof to the scan data input terminal (SIN) of said data signal selector (3a) of a subsequently identified one relative thereto among said plurality of scanning flip-flop circuits (5l–5i); and said each of said plurality of scanning flip-flop circuits (5l–5i) having said master/slave flip-flop circuit (4) thereof including a master flip-flop (4A) connected at an input end thereof to the selected data input terminal (D), to the selected clock input terminal (CK), and to a masking signal input terminal (MASK) for receiving a masking signal (MASK) input thereto in the scan data latching operation of said logic integrated circuit (1), the masking signal (MASK) being substantially equivalent in period and leading in phase to the scan clock signal (SC) so that, in the scan data latching operation of said logic integrated circuit (1), the master flip-flop (4A) has a test data latching action thereof masked to be delayed by the masking signal (MASK).

2. The logic integrated circuit as claimed in claim 1, wherein the master flip-flop (4A) comprises:

a masking circuit comprising a pair of 3-input logical OR circuits, one of said OR circuits having input connections to the selected data input terminal (D), the selected clock input terminal (CK) and the masking signal input terminal (MASK) and the other of said OR circuits having input connections to the selected clock input terminal (CK) and the masking signal input terminal (MASK) and through an inverter to the selected data input terminal (D); and a latch circuit connected to the masking circuit.

3. The logic integrated circuit as claimed in claim 1, wherein the master flip-flop (4A) comprises a pair of cross-connected CMOS transfer gates and a plurality of inverters.

* * * * *